Aug. 1, 1939. D. D. AREHART 2,168,147

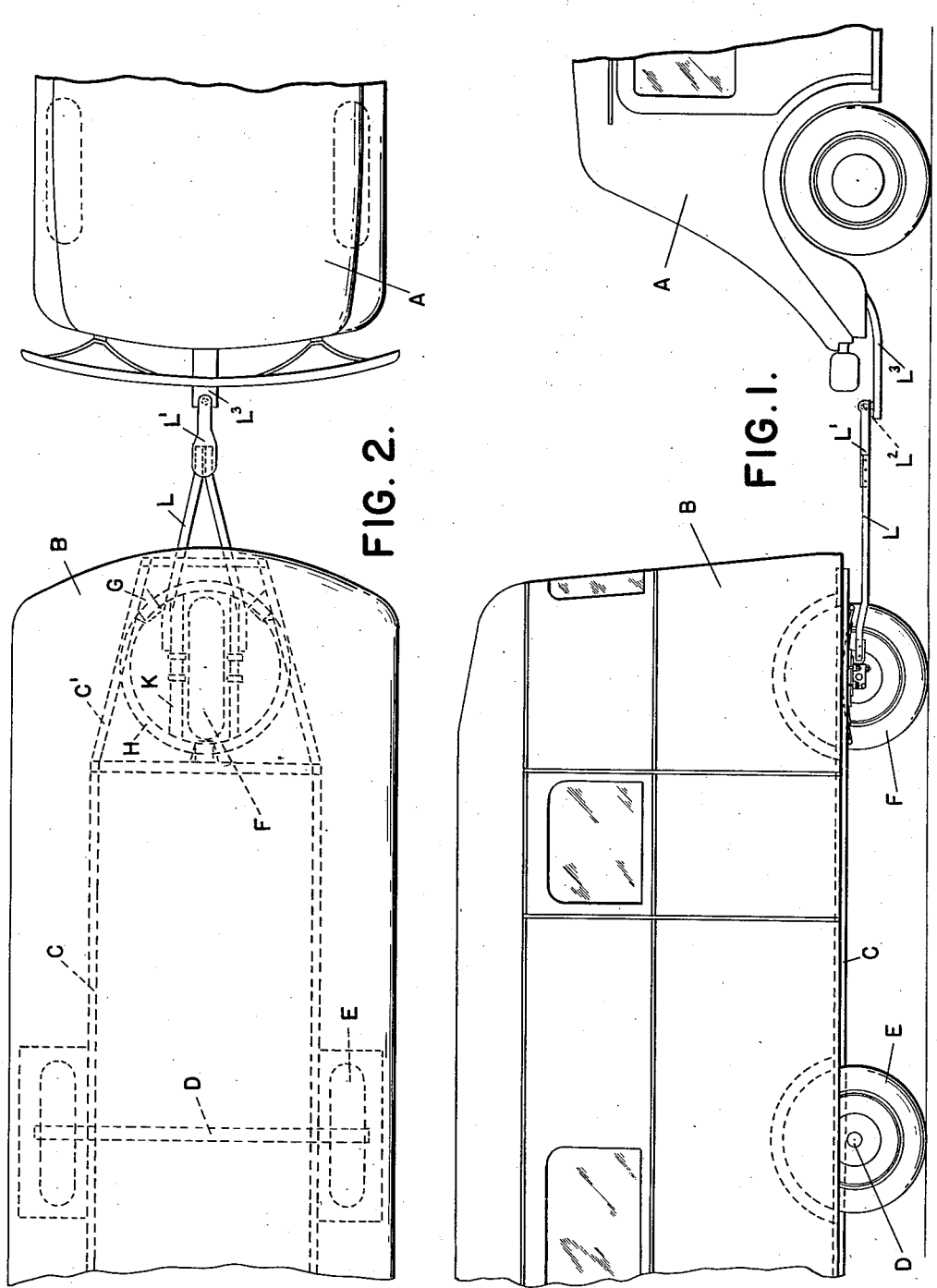

MOTOR VEHICLE TRAILER

Filed Oct. 26, 1936 3 Sheets-Sheet 2

INVENTOR
DAVID D. AREHART
BY *Whittemore Hulbert & Belknap*
ATTORNEYS

Aug. 1, 1939.     D. D. AREHART     2,168,147
MOTOR VEHICLE TRAILER
Filed Oct. 26, 1936     3 Sheets-Sheet 3
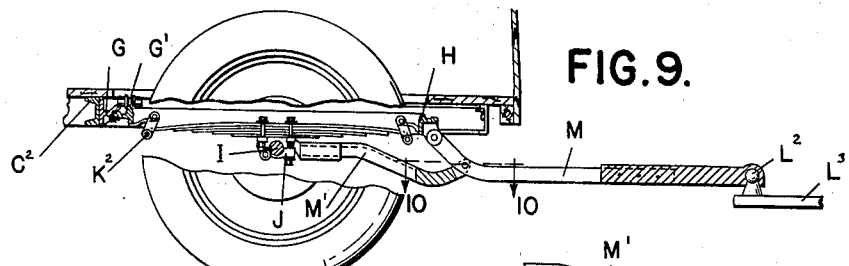
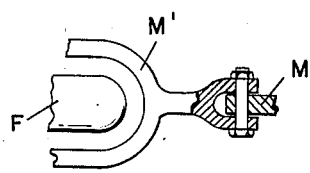
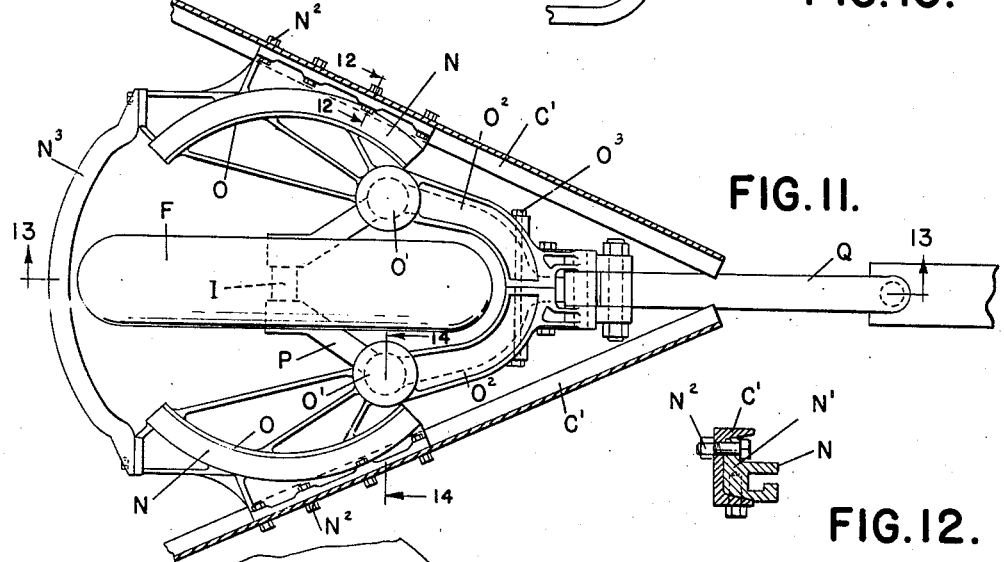
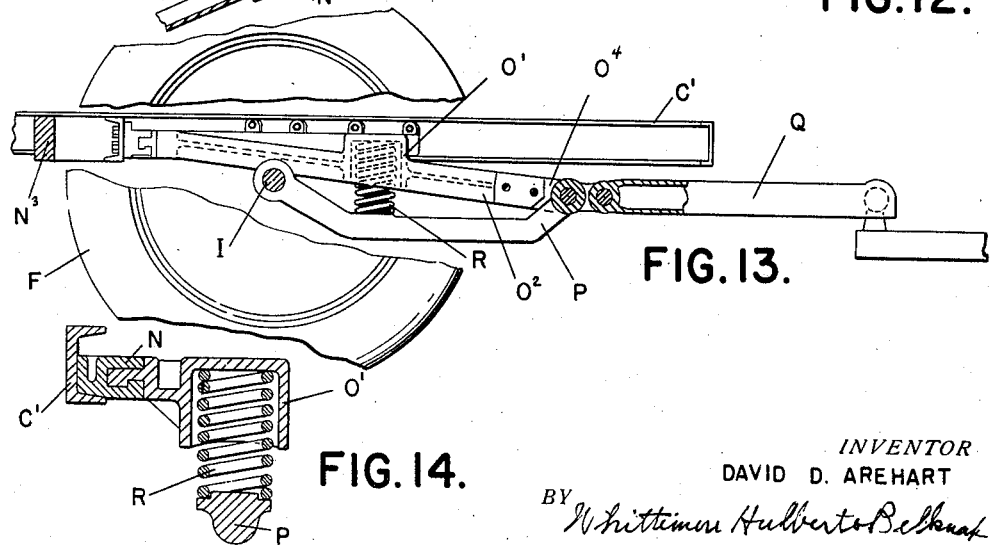
*INVENTOR*
DAVID D. AREHART
*ATTORNEYS*

Patented Aug. 1, 1939

2,168,147

UNITED STATES PATENT OFFICE 2,168,147

MOTOR VEHICLE TRAILER

David D. Arehart, Flint, Mich., assignor to Palace Travel Coach Corporation, Flint, Mich., a corporation of Michigan Application October 26, 1936, Serial No. 107,683

6 Claims. (Cl. 280—33.5)

The invention relates to motor vehicle trailers and has more particular reference to constructions normally supported on three wheels. It is the primary object of the invention to provide a construction of third wheel which affords resilient support for the trailer body and which is interconnected with the draft means so as to be steered in both forward and backward movements. To this end the invention consists in the construction as hereinafter set forth.

In the drawings:

Figure 1 is a side elevation showing my improved trailer and a portion of the tractor to which it is attached;

Figure 2 is a plan view;

Figure 9 is a view similar to Figures 4 and 8 showing another modification;

Figure 10 is a sectional plan view on line 10—10 of Figure 9;

Figure 11 is a plan view showing another modification;

Figure 12 is a cross section on line 12—12 of Figure 11;

Figure 13 is a longitudinal section on line 13—13 of Figure 11;

Figure 14 is an enlarged cross section on line 14—14 of Figure 11.

As shown in Figures 1 and 2, A is a tractor such as an automobile and B is my improved trailer. This includes a body having sill members C supported on a rear axle D and wheels E and with any suitable type of spring suspension (not shown). The forward end of the body is supported on a third wheel F which as illustrated in Figures 3 to 5 is constructed as follows:

The sill members C preferably channel bars are formed with converging forward portions C' and with cross-connecting members $C^2$ and $C^3$. Connected to the portions C' and $C^2$ are bracket members G which have mounted thereon the grooved rollers G'. These are so positioned and in such angular relationship to each other as to form supporting roller bearings for engaging a circular track H. The latter forms a mounting frame for the third wheel F and is of sufficient diameter to provide clearance for said wheel when arranged centrally thereof. The wheel is provided with an axle I, the opposite ends of which engage bearings J and these bearings are clipped to leaf springs K extending longitudinally on opposite sides of the wheel and in parallel relation to each other. One end of each leaf spring is pivotally attached at K' to the circular track or ring H, while its opposite end is connected to said track by shackles $K^2$. Thus the load is resiliently supported upon the wheel F and with sufficient clearance within the track H for all vertical oscillations. The bearings J have forwardly extending portions J' which are attached to draft bars L. The forward portions of these converge and are attached to a member L' which at its forward end has a universal joint $L^2$ with a bracket member $L^3$ connected to the tractor.

Figure 6:
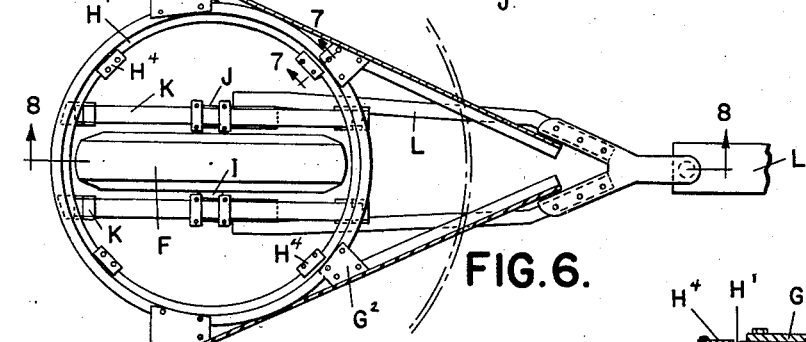
Figure 6 is a plan view similar to Figure 3 showing a modified construction.
Figure 7:
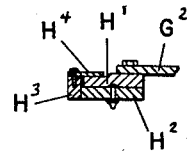
Figure 7 is a cross section on line 7—7 of Figure 6.
Figure 8:
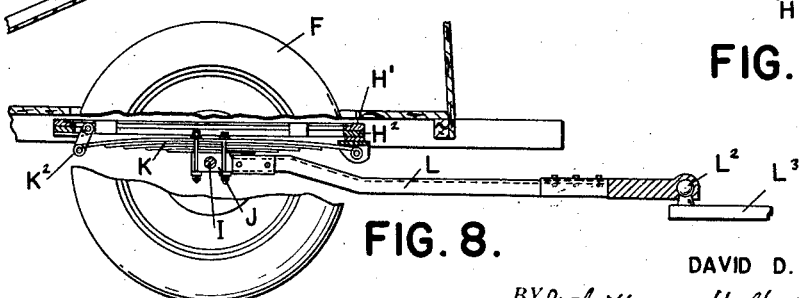
Figure 8 is a longitudinal section on line 8—8 of Figure 6.

The construction shown in Figures 6 to 8 is similar to that just described with the exception that in place of the rollers G' a circular track member H' is rigidly secured to the sills by brackets $G^2$. Beneath this track H' is a revoluble ring $H^2$ held in registration therewith by peripheral guides $H^3$ at a plurality of points and with fingers $H^4$ overlapping the track H' to hold the parts together. The axle, bearings, springs, etc., are similar to the construction first described.

Figure 5:
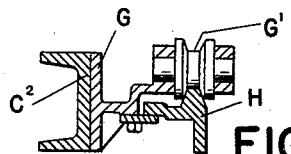
Figure 5 is an enlarged view of a portion of Figure 4.
Figure 3:
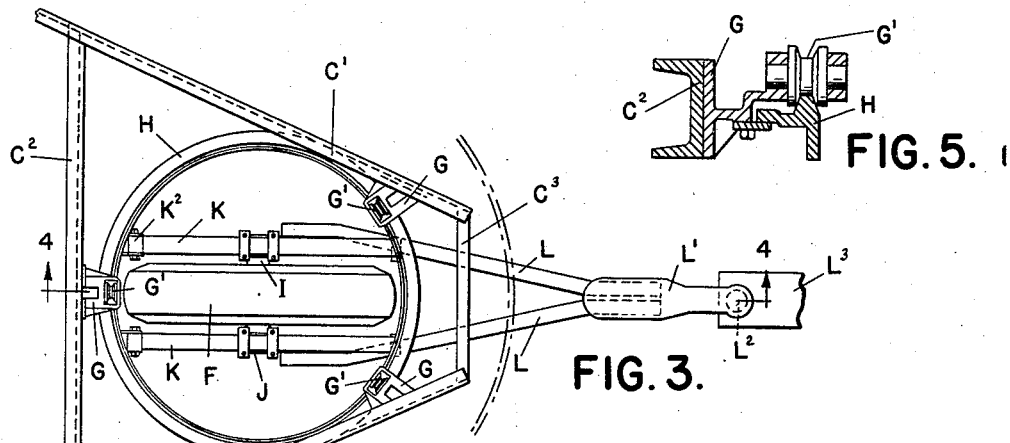
Figure 3 is an enlarged plan view of the third wheel and its connections.
Figure 4:
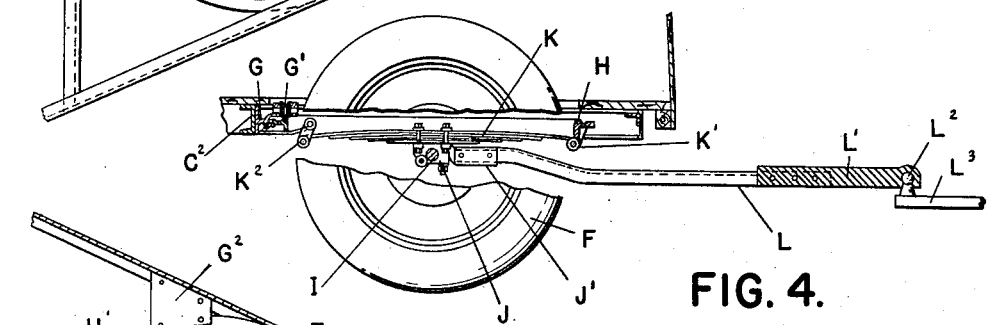
Figure 4 is a vertical section on line 4—4 of Figure 3.

The construction illustrated in Figures 9 and 10 is similar to the construction illustrated in Figures 3 to 5, but in place, of connecting the draft bar L solely to the axle bearings, there is provided a draft bar M rigidly attached to the track H and also connected by a pivotal link member M' to the axle bearings. With this construction the draft is transmitted directly to the track instead of through the medium of the suspension springs, as in the construction first described.

In Figures 11 to 14 another modification is illustrated comprising segmental grooved track members N which are rigidly secured to the sill members C' preferably by providing them with portions N' which fit within the channels of the sills and are secured by bolts $N^2$. The rear ends of these segmental track members are also preferably cross-connected by a brace member $N^3$ which is curved to provide clearance for the wheel F. Slidably engaging the grooves in these track members N are shoes O which have formed integral therewith inverted cupped members O' and also forwardly extending arms $O^2$ which are curved to provide clearance for the wheel and are then bolted to each other as indicated at O³. Forward of this point of attachment are the furcations O⁴ which embrace and are pivotally attached to arms P extending rearwardly and a forwardly extending draft bar Q. The arms P at their rear ends are provided with bearings for engaging the axle I and these arms are so fashioned as to pass beneath the inverted cup O'. Springs R are then placed within the cups to bear against the arms P and to form the resilient support for the load.

With all of the various modifications the operation is substantially the same in that the wheel F is always maintained in the plane of the draft bar. Consequently, this wheel will be steered to correspond to any change in direction of movement of the tractor and this is equally true whether the tractor is moved forward or backward.

What I claim as my invention is:

1. In a trailer, the combination of a body, an angularly adjustable supporting wheel therefor, an axle for said wheel, a bifurcated draft connection embracing said wheel and engaging said axle, an open frame having segmental portions concentric with a vertical axis centrally intersecting the axis of said wheel, bearing means engaging said segmental portions in a horizontal plane adjacent to said axle to permit relative rotation thereof, one of said relatively rotatable members being mounted on said body, and resilient supporting means between the other of said relatively rotatable members and said wheel.

2. In a trailer, the combination of a body, an angularly adjustable supporting wheel therefor, an axle for said wheel, a bifurcated draft member embracing said wheel, bearings on the furcations of said draft member engaging said axle, an open frame having segmental portions concentric with a vertical axis centrally intersecting the axis of said wheel, bearing means engaging said segmental portions in a horizontal plane adjacent to said axle to permit relative rotation thereof, one of said relatively rotatable members being secured to said body, and resilient means interposed between the other of said relatively rotatable members and the axle engaging bearings to permit relative vertical movement thereof, said resilient means also transmitting the draft from said axle to said body member.

3. In a trailer, the combination of a body, an angularly adjustable supporting wheel therefor, an axle for said wheel, a draft member connected to said axle, an open frame having segmental portions concentric with a vertical axis centrally intersecting the axis of said wheel, said frame being of a diameter to provide clearance for vertical oscillations of said wheel, bearing means engaging said segmental portions in a horizontal plane adjacent to said axle and connected to said body, a spring connected to said axle and extending across said open frame and connected thereto to form a resilient support therefor.

4. In a trailer, the combination of a body, an angularly adjustable supporting wheel therefor, an axle for said wheel, a circular track concentric with a vertical axis centrally intersecting the axis of said wheel, a bearing on said body rotatively engaging said circular track in a horizontal plane adjacent to said axle, bearings engaging said axle on opposite sides of said wheel, springs secured to said bearings extending across said circular track and connected thereto to form a resilient support therefor, and a draft connection for said wheel.

5. In a trailer, the combination of a body, an angularly adjustable supporting wheel therefor, an axle for said wheel, a circular track concentric with a vertical axis centrally intersecting the axis of said wheel, a bearing on said body rotatively engaging said circular track in a horizontal plane adjacent to said axle, bearings engaging said axle on opposite sides of said wheel, springs secured to said bearings extending across said circular track and connected thereto to form a resilient support therefor, a draft connection for said body, and a bifurcated extension of said draft connection connected to said axle bearings.

6. In a trailer, the combination of a body, an angularly adjustable supporting wheel therefor, an axle for said wheel, an open frame having diametrically opposed segmental portions concentric with a vertical axis centrally intersecting the axis of said wheel, said frame being secured to said body, a draft connection having a bifurcated portion embracing said wheel, shoes on the furcations slidably engaging the segmental portions of said frame, links pivotally engaged at their forward ends with said draft connection and at their rear ends engaging said axle, and springs interposed between said links and the furcations of said draft connection to resiliently support said body upon said wheel.

DAVID D. AREHART.